United States Patent [19]

Lynn

[11] 4,330,478

[45] May 18, 1982

[54] METHOD OF OXIDIZING A POLYVALENT METAL

[75] Inventor: Scott Lynn, Walnut Creek, Calif.

[73] Assignee: The Regents of the University of California, Berkeley, Calif.

[21] Appl. No.: 106,651

[22] Filed: Dec. 26, 1979

[51] Int. Cl.$^3$ ............................................. C07F 15/02
[52] U.S. Cl. .................................. 260/439 R; 75/117; 134/13; 204/108; 260/429 J; 260/438.1; 260/438.5 R; 423/140; 423/224; 423/242; 423/245
[58] Field of Search ............. 260/439 R, 429 J, 438.1, 260/438.5 R

[56] References Cited

U.S. PATENT DOCUMENTS

| | | | |
|---|---|---|---|
| 2,844,551 | 7/1958 | Orthner et al. | 260/429 J X |
| 3,135,706 | 6/1964 | Vandenberg | 260/448 B X |
| 3,208,975 | 9/1965 | Vandenberg | 260/448 B X |
| 3,226,320 | 12/1965 | Meuly et al. | 423/206 X |
| 3,974,197 | 8/1976 | Parliment | 260/429 J X |

OTHER PUBLICATIONS

Martell et al., Chemistry of the Metal Chelate Compounds, Prentice Hall, N.Y., pp. 350 to 357 (1952).
Angew. Chem. Int. Ed. 14, p. 284 (1975).

*Primary Examiner*—Helen M. S. Sneed
*Attorney, Agent, or Firm*—Edward B. Gregg

[57] ABSTRACT

Process of carrying out oxidation-reduction reactions such as oxidation of hydrogen sulfide to sulfur, in which a polyvalent metal chelate with a certain class of polycarboxylic acid is employed, the metal being reduced from a higher valence state to a lower valence state during reduction and back to the higher valence state by oxidation. The class of polycarboxylic acids are those which have a substituent which enhances acidity yet is stable toward oxidation.

7 Claims, No Drawings

METHOD OF OXIDIZING A POLYVALENT METAL

This invention relates to certain novel chelates of polyvalent metals whose cations have two or more oxidation states and to the use of such chelates for carrying out certain chemical reactions. This invention, although applicable to other polyvalent metals having two or more valences such as cobalt, nickel, copper, etc. is preferably employed with the ferrous/ferric iron system and will first be described with reference to such systems.

There are a number of processes in which the ferric ion is reduced to the ferrous ion and it is desirable to re-oxidize the ferrous ion to the ferric ion. There are other processes in which it is desirable to oxidize the ferrous ion to the ferric ion. Among such processes which benefit by the present invention are the following:

A. Oxidation of hydrogen sulfide to sulfur by ferric iron and recovery of ferric iron by oxidation of ferrous iron A method of eliminating hydrogen sulfide from industrial waste gases, process gases, sour natural gas and the like, is provided by the reaction $$2Fe^{+3} + H_2S \rightarrow 2Fe^{+2} + 2H^+ + S \quad (1)$$

The sulfur, if not oxidized to a higher oxidation state, lends itself to facile recovery by application of heat to melt it. If the reaction is carried out at a temperature above the melting point of sulfur further heating is unnecessary to recover the sulfur in liquid form. To be economical, this process requires a practical method of re-oxidizing the ferrous iron to ferric iron. This is most economically done by passing air through the solution of ferrous salt whereby molecular oxygen in the air accomplishes the oxidation, but the acidity of the solution increases during the course of Reaction (1) and such acidity has the effect of retarding the re-oxidation reaction.

B. Recovery of ferric oxide from waste pickling liquor

The waste liquor from pickling steel with sulfuric acid contains ferrous sulfate. It is advantageous to re-oxidize the ferrous iron to ferric iron, to recover the ferric iron as a precipitate of ferric oxide or hydroxide and to regenerate sulfuric acid.

C. Recovery of copper and iron from the liquor resulting from leaching of chalcopyrite with ferric iron Chalcopyrite, $CuFeS_2$, is a common copper ore which can be leached by ferric iron as follows:

$$CuFeS_2 + 4Fe^{+3} \rightarrow Cu^{+2} + 2S + 5Fe^{+2} \quad (2)$$

Difficulty is encountered in recovering copper and iron from the solution. Such recovery would benefit by a practical method of oxidizing the ferrous iron to the ferric state. Copper may be recovered by reduction with iron or by electrolylic reduction.

It is known that certain complexing or chelating agents catalyze the reaction between oxygen and the ferrous iron to produce ferric iron. For example, in Meuly and Seldner U.S. Pat. No. 3,226,320, chelates of polyvalent metals (among them iron) with certain complexing agents are used in the oxidation of hydrogen sulfide and mercaptans. Chelating agents mentioned in this patent are acetyl acetone, cyclopentadiene, ethylene diamine tetra-acetic acid, N-hydroxyethyl ethylene diamine triacetic acid, gluconic acid, tartaric acid and citric acid. Also, in Lynn and Dubs U.S. patent application Ser. No. 891,545, entitled "OXIDATIVE REMOVAL OF $H_2S$ FROM GASEOUS STREAMS," filed Mar. 20, 1978, the conjoint use of certain amines and nitrilotriacetic acid (NTA) is described.

Difficulties are encountered with such a system. For example, certain of the chelating agents bind so strongly to the ferric ion that more than an equivalent weight of the chelating agent is required to cause the oxidation reaction to go to completion. Also, some if not all of these chelating agents are sensitive to oxidation by ferric iron at temperatures above 65° C.

It is an object of the present invention to provide improvements in the use of iron and other chelates which are operative to promote or catalyze certain oxidation-reduction reactions.

It is a particular object of the present invention to provide chelate catalysts or agents of the general character described which have one or more of the following characteristics: Resistance to oxidation at temperatures of about 65° to 120° C.; formation of loosely bound chelates with the chosen polyvalent metal in its oxidized state; an ability to function as catalysts of the reaction between $O_2$ and $Fe^{+2}$ at low pH such as 4.5 or lower.

Another object of the invention is to provide new and useful means of carrying out certain oxidation-reduction reactions.

The above and other objects of the invention will be apparent from the ensuing description and the appended claims.

I have found that chelates of (1) strong ($pK_2 \leq 4.5$) polycarboxylic acids which are devoid of functional groups that are readily oxidized and (2) a polyvalent metal having two or more oxidation states such as iron, cobalt, nickel and copper, are advantageous as reagents and catalysts for a variety of industrially important oxidation reactions. (By $pK_2$ is meant the dissociation constant of the second carboxyl hydrogen of the polycarboxylic acid.)

A preferred acid for the chelate is carboxymethyloxysuccinic acid (hereinafter referred to as CMOS):

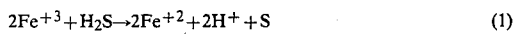

This acid is described in Lambert and Konort U.S. Pat. No. 3,914,297 as an acid whose alkali metal, ammonium and substituted ammonium salts are useful as builders for detergent compositions. Other acids which may be used include:

DIGLYCOLLIC ACID

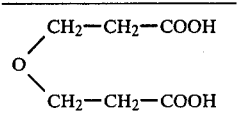

CITRIC ACID, METHYL ETHER

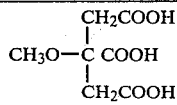

and 2,3 DIMETHOXY SUCCINIC ACID

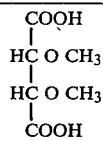

The general class of such acids may be defined as aliphatic polycarboxylic acids which are free from readily oxidized functional groups (e.g. hydroxyl and amino) and which contain in addition to the carboxy groups, one or more functional groups (other than carboxy and not readily oxidized) which function to boost the strength of the acid, so that $pK_2$ is 4.5 or less. Substituents which are readily hydrolyzed to readily oxidizable groups, e.g. halogens, which enhance acidity but are hydrolyzable to hydroxyl groups, are preferably not present. A group may be regarded as readily oxidizable if it reacts with $Fe^{+3}$ at a significant rate at 65° C.

In 1, 2, 3 and 4 above, the group which enhances acidity is a methoxy group. Other appropriate enhancing groups are ethoxy, propyloxy and butyloxy; i.e. —OR groups in which R is $C_1$ to $C_4$ alkyl.

Although iron is the preferred metal for use in these chelates, other polyvalent metals which form cations in two or more states of oxidation may be used, such as cobalt, nickel and copper.

The chelates are readily formed in situ. For example, an aqueous solution was prepared which was 0.1 molar with respect to ferrous sulfate, 0.11 molar with respect to the sodium salt of CMOS and 0.11 molar with respect to ammonium sulfate (a buffering agent). Acidity was adjusted to pH 4.0 by adding sulfuric acid. Air is bubbled through the solution to oxidize the ferrous iron to ferric iron.

The following specific examples will serve further to illustrate the practice and advantages of the invention.

EXAMPLE 1

In the oxidation of hydrogen sulfide to sulfur as in Example A above, it is desirable to recover the ferric iron by oxidation of ferrous iron by means of molecular oxygen in the form of air but such re-oxidation is impeded by increasing acidity that occurs during the re-oxidation reaction. In accordance with the present invention, a solution of $Fe^{+3}$ CMOS prepared as described above was employed. Hydrogen sulfide was passed through the solution, and the spent solution was regenerated by bubbling air through it at ambient temperature. Sulfur was recovered from the solution.

EXAMPLE 2

To waste pickling liquor resulting from the pickling of steel with sulfuric acid an amount of the sodium slat of CMOS equal to a molar ratio of ferrous iron to CMOS of 10 to 1 is added. Air is bubbled through the liquor to oxidize the ferrous iron to ferric iron and to form a precipitate of $FeOHSO_4$. The resulting slurry is treated with sulfuric acid to dissolve the basic ferric sulfate.

$$2FeOHSO_4 + H_2SO_4 \rightarrow 2Fe^{+3} + 3SO_4^= + 2H_2O.$$

The solution is heated to 120°–150° resulting in precipitation of $Fe_2O_3$ in crystalline, readily filterable form, leaving a mother liquor of 3 to 5% sulfuric acid which can be recycled as pickling solution. The ferric oxide is a useful by-product. This avoids or greatly diminishes the problem of disposal of waste pickling liquor.

EXAMPLE 3

To a solution resulting from the leaching of chalcopyrite and recovery of metallic copper by cementation with metallic iron as in Example C is added the sodium salt of CMOS in a molar ratio of CMOS to ferrous iron of 1 to 10. Air is bubbled through the solution to re-oxidize $Fe^{+2}$ to $FE^{+3}$, and to form a precipitate of $FeOHSO_4$. This is converted into regenerated leach solution and $Fe_2O_3$ by the procedure described in Example 2.

The polyvalent metal, preferably iron, chelate or complex may be used in an oxidation-reduction system such as waste gas containing $H_2S$ and to which air is added. The ferric iron oxidizes the hydrogen sulfide to sulfur and the oxygen in the air re-oxidizes the ferrous iron to ferric iron. Thus where it is desired to remove hydrogen sulfide or a mercaptan (which oxidizes to a disulfide, R—S—S—R which is readily removed) from a waste gas, air may be added and a one-step oxidation-reduction-reoxidation (of ferrous iron) process is feasible. Where it is not desired to dilute the gas that is being treated, as in the case of synthesis gas, a two-step process may be carried out including, for example, oxidation of $H_2S$ to sulfur, then separate regeneration of the ferric iron by a separate step of bubbling air through the spent solution.

An advantage of the process of the present invention is that the oxidation of, for example, $H_2S$ to sulfur is irreversible and does not result in a residium of the $H_2S$ according to a condition of equilibrium.

By using more concentrated, e.g. 1.0 molar solution of chelate, the capacity of the system is increased.

It will therefore be apparent that a new and advantageous reaction and a new and advantageous class of catalysts/reagents have been provided.

I claim:

1. A method of oxidizing the cation of a polyvalent metal M from a lesser state of oxidation, to a higher state of oxidation, $M^{+a} \rightarrow M^{+b}$ wherein a and b are positive integers defining the respective states of oxidation of M and b is greater than a, said method comprising providing the cation $M^{+a}$ in aqueous solution in the presence of a chelating agent and effecting the oxidation, $M^{+a} \rightarrow M^{+b}$, by contact with molecular oxygen, said chelating agent being an aliphatic polycarboxylic acid capable of forming chelates with one or both $M^{+a}$ and $M^{+b}$, having a $pK_2$ not greater than about 4.5 and being devoid of readily oxidizable groups and groups which are readily hydrolyzable to readily oxidizable groups.

2. The method of claim 1 wherein the metal M is iron.

3. The method of claim 2 wherein the chelating agent contains as a substituent an ether group in a position to enhance acidity of the acid.

4. The method of claim 3 wherein the chelating agent is carboxymethoxysuccinic acid.

5. The method of claim 3 wherein the chelating agent is diglycollic acid.

6. The method of claim 3 wherein the chelating agent is the methyl ether of citric acid.

7. The method of claim 3 wherein the chelating agent is 2,3-dimethoxysuccinic acid.

* * * * *